United States Patent
Murakoshi

(10) Patent No.: US 6,995,854 B1
(45) Date of Patent: Feb. 7, 2006

(54) METHOD AND APPARATUS FOR FACSIMILE DATA OUTPUT SORTING

(75) Inventor: Katsuya Murakoshi, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 862 days.

(21) Appl. No.: 09/691,235

(22) Filed: Oct. 19, 2000

(30) Foreign Application Priority Data

Nov. 5, 1999 (JP) .................................. 11-314846

(51) Int. Cl.
  *B41B 1/00* (2006.01)
  *G06F 15/00* (2006.01)
  *H04N 1/32* (2006.01)

(52) U.S. Cl. ...................... 358/1.15; 358/1.19; 358/442

(58) Field of Classification Search ................ 358/500, 358/532, 505, 1.9, 1.15, 442, 468, 296, 533; 382/240; 347/15; 399/1; 270/1.01; 271/9.05; 344/15
See application file for complete search history.

(56) References Cited

U.S. PATENT DOCUMENTS

| | | | | |
|---|---|---|---|---|
| 4,769,675 A | * | 9/1988 | Watanabe | 399/6 |
| 4,980,760 A | * | 12/1990 | Hiratsuka et al. | 358/532 |
| 5,127,643 A | * | 7/1992 | DeSanctis et al. | 371/9.05 |
| 5,185,661 A | * | 2/1993 | Ng | 358/505 |
| 5,262,851 A | * | 11/1993 | Nakatani et al. | 358/500 |
| 5,316,279 A | * | 5/1994 | Corona et al. | 270/1.01 |
| 5,414,494 A | * | 5/1995 | Aikens et al. | 399/1 |
| 5,438,436 A | * | 8/1995 | Harris | 358/500 |
| 5,440,408 A | * | 8/1995 | Tomita | 358/468 |
| 5,611,066 A | * | 3/1997 | Keele et al. | 711/100 |
| 5,739,920 A | * | 4/1998 | Nakajima et al. | 382/240 |
| 5,832,190 A | * | 11/1998 | Terajima et al. | 358/1.14 |
| 5,877,782 A | * | 3/1999 | Imai et al. | 347/3 |
| 5,911,095 A | * | 6/1999 | Atsumi et al. | 399/80 |
| 6,005,587 A | * | 12/1999 | Takahashi et al. | 715/733 |
| 6,081,342 A | * | 6/2000 | Nakai et al. | 358/1.16 |
| 6,088,050 A | * | 7/2000 | Ng | 347/237 |
| 6,325,478 B1 | * | 12/2001 | Imai et al. | 347/15 |
| 6,359,707 B1 | * | 3/2002 | Tadokoro et al. | 358/500 |
| 6,466,935 B1 | * | 10/2002 | Stuart | 707/10 |
| 6,545,771 B1 | * | 4/2003 | Sakai et al. | 358/1.9 |
| 6,636,711 B1 | * | 10/2003 | Katahira | 399/82 |
| 6,911,993 B2 | * | 6/2005 | Nishikawa et al. | 347/116 |
| 2002/0015166 A1 | * | 2/2002 | Wakai et al. | 358/1.11 |

FOREIGN PATENT DOCUMENTS

JP 04270548 A * 9/1992

(Continued)

*Primary Examiner*—Madeleine Nguyen
(74) *Attorney, Agent, or Firm*—Oblon, Spivak, McClelland, Maier & Neustadt, P.C.

(57) ABSTRACT

A facsimile apparatus which includes at least one communications mechanism, a printing mechanism, a memory, a transfer sheet selection mechanism, and a processor. The communications mechanism transmits and receives facsimile image data through a specific facsimile procedure. The printing mechanism has a plurality of print colors. The memory stores a relationship between the print colors and the communications mechanism. The transfer sheet selection mechanism selects a type of transfer sheet. The processor selects one of the print colors in accordance with the data table stored in the memory when the communications mechanism receives facsimile image data and to instruct the printing mechanism to print the received facsimile image data using one of the print colors selected by the processor.

27 Claims, 6 Drawing Sheets

FOREIGN PATENT DOCUMENTS

| | | | | |
|---|---|---|---|---|
| JP | 08169620 A | * | 7/1996 | |
| JP | 09051388 A | * | 2/1997 | |
| JP | 10107936 A | * | 4/1998 | |
| JP | 10-264484 | | 10/1998 | |
| JP | 2000299754 A | * | 10/2000 | |
| JP | 2003309702 A | * | 10/2003 | |

* cited by examiner

FIG. 3

| TTI | PRINT COLOR |
|-----|-------------|
| ABC | RED |
| DEF | BLUE |
| ⋮ | ⋮ |

FIG. 5

| TTI | PRINT COLOR | SHEET TRAY |
|---|---|---|
| ABC | RED | FIRST TRAY |
| DEF | RED | FIRST TRAY |
| GHI | BLUE | SECOND TRAY |
| JKL | BLUE | SECOND TRAY |
| ⋮ | ⋮ | |

US 6,995,854 B1

METHOD AND APPARATUS FOR FACSIMILE DATA OUTPUT SORTING

CROSS-REFERENCE TO RELATED APPLICATIONS

This application claims priority to Japanese patent application No. JPAP11-314846 filed on Nov. 5, 1999 in the Japanese Patent Office, the entire contents of which are hereby incorporated by reference.

BACKGROUND

1. Field of the Invention

The present invention relates to a method and apparatus for facsimile data output sorting, and more particularly to a method and apparatus for facsimile data output sorting that is capable of effectively handling a plurality of print colors and input sheet trays relative to a single output sheet tray.

2. Description of the Related Arts

Conventionally, facsimile apparatuses are equipped with a single output sheet tray to receive all transfer sheets after the reproduction process relative to the facsimile data received from other facsimile machines. Users are required on these facsimile apparatuses to sort the output sheets stacked in the single output sheet tray after receiving the facsimile data from a number of different senders.

A facsimile apparatus capable of sorting on a sender-to-sender basis is described in Japanese Laid-Open Patent Publication No. 10-264484. In this facsimile apparatus, facsimile data is reproduced on a transfer sheet having a different color or size from one used for the facsimile data previously received. This technique, however, requires an employment of multiple input trays to the facsimile apparatus, for receiving differently-colored or differently-sized transfer sheets. Accordingly, the manufacturing cost of the facsimile apparatus is increased by the installation of the multiple input trays. Moreover, it requires a preparation of a number of differently-colored or differently-sized transfer sheets by the users, which is not convenient at all for the users.

SUMMARY

The present invention provides a novel facsimile apparatus which includes at least one communications mechanism, a printing mechanism, a memory, a transfer sheet selection mechanism, and a processor. The above-mentioned at least one communications mechanism is configured to transmit and receive facsimile image data through a specific facsimile procedure. The printing mechanism is configured to have a plurality of print colors. The memory stores a data table representing a relationship between the print colors and the communications mechanism. The transfer sheet selection mechanism is configured to select a type of transfer sheet. The processor is configured to select one of the print colors in accordance with the data table stored in the memory when the communications mechanism receives facsimile image data and to instruct the printing mechanism to print the received facsimile image data using one of the print colors selected by the processor.

The processor may be configured to select one of the plurality of print colors in accordance with the data table stored in the memory on a basis of a communications mechanism used to receive the facsimile image data.

The memory may store a data table representing a relationship between the print colors and identification information for identifying a sender of facsimile image data. In this case, the identification information is included in the received facsimile image data. The processor may further be configured to select one of the print colors in accordance with the data table stored in the memory on a basis of the identification information.

The communications mechanism may be configured to transmit and receive the facsimile image data through any one of G3 and G4 facsimile procedures.

The identification information may be any one of a transmitter terminal identification, a called station identification, and a remote terminal identifier, included in a header of the received facsimile image data.

The memory may store a data table representing a relationship among the print colors, the type of transfer sheet, and the communications mechanism, and the processor may be configured to select one of the print colors and the type of transfer sheet in accordance with the data table stored in the memory.

The processor may be configured to select one of the print colors and the type of transfer sheet in accordance with the data table stored in the memory on a basis of a communications mechanism used to receive the facsimile image data.

The memory may store a data table representing a relationship between the print colors, the type of transfer sheet, and identification information for identifying a sender of facsimile image data. In this case, the identification information is included in the received facsimile image data. The processor may further be configured to select one of the print colors and the type of transfer sheet in accordance with the data table stored in the memory on a basis of the identification information.

The transfer sheet selection mechanism may be configured to select one of transfer sheet trays and the memory may store a data table representing a relationship among the print colors, the one of transfer sheet trays, and the communications mechanism. The processor may further be configured to select one of the print colors and one of the transfer sheet trays in accordance with the data table stored in the memory.

The present invention further provides a novel method of sorting output transfer sheets in a facsimile apparatus. In one example, a novel method includes the steps of storing, selecting, and printing. The storing step stores a data table representing a relationship between a plurality of print colors and at least one communications procedure. The selecting step selects one of the print colors in accordance with the data table stored in the storing step when the facsimile apparatus receives facsimile image data through the communications procedure. The printing step prints the received facsimile image data in one the of print colors selected in the selecting step.

The selecting step may select one of the print colors in accordance with the data table stored in the storing step on a basis of the communications procedure used to receive the facsimile image data.

The storing step may store a data table representing a relationship between the print colors and identification information for identifying a sender of facsimile image data. In this case, the identification information is included in the received facsimile image data. The selecting step may select one of the print colors in accordance with the data table stored in the storing step on a basis of the identification information.

The communications procedure may be any one of G3 and G4 facsimile procedures.

The identification information may be any one of a transmitter terminal identification, a called station identification, and a remote terminal identifier, included in a header of the received facsimile image data.

The storing step may store a data table representing a relationship among the print colors, a type of transfer sheet, and the communications procedure and the selecting step may select one of the print colors and the type of transfer sheet in accordance with the data table stored in the storing step. In this case, the printing step may print the received facsimile image data in one of the print colors and on the type of transfer sheet both selected in the selecting step.

The selecting step may select one of the print colors and the type of transfer sheet in accordance with the data table stored in the storing step on a basis of the communications procedure used to receive the facsimile image data.

The storing step may store a data table representing a relationship between the print colors, the type of transfer sheet, and identification information for identifying a sender of facsimile image data. In this case, the identification information is included in the received facsimile image data. The selecting step may select one of the print colors and the type of transfer sheet in accordance with the data table stored in the storing step on a basis of the identification information.

The above-mentioned method may further include a switching step for switching between a plurality of transfer sheet trays. In this case, the storing step may store a data table representing a relationship among the print colors, the transfer sheet trays, and the communications procedure, and the selecting step may select one of the print colors and one of the transfer sheet trays in accordance with the data table stored in the storing step.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIG. 3 is a data table representing a relationship between sender identifications of facsimile image data and the print colors;

FIG. 5 is a data table representing a relationship between the sender identifications of facsimile image data, the print colors, and input sheet trays.

DETAILED DESCRIPTION

Figure 1:
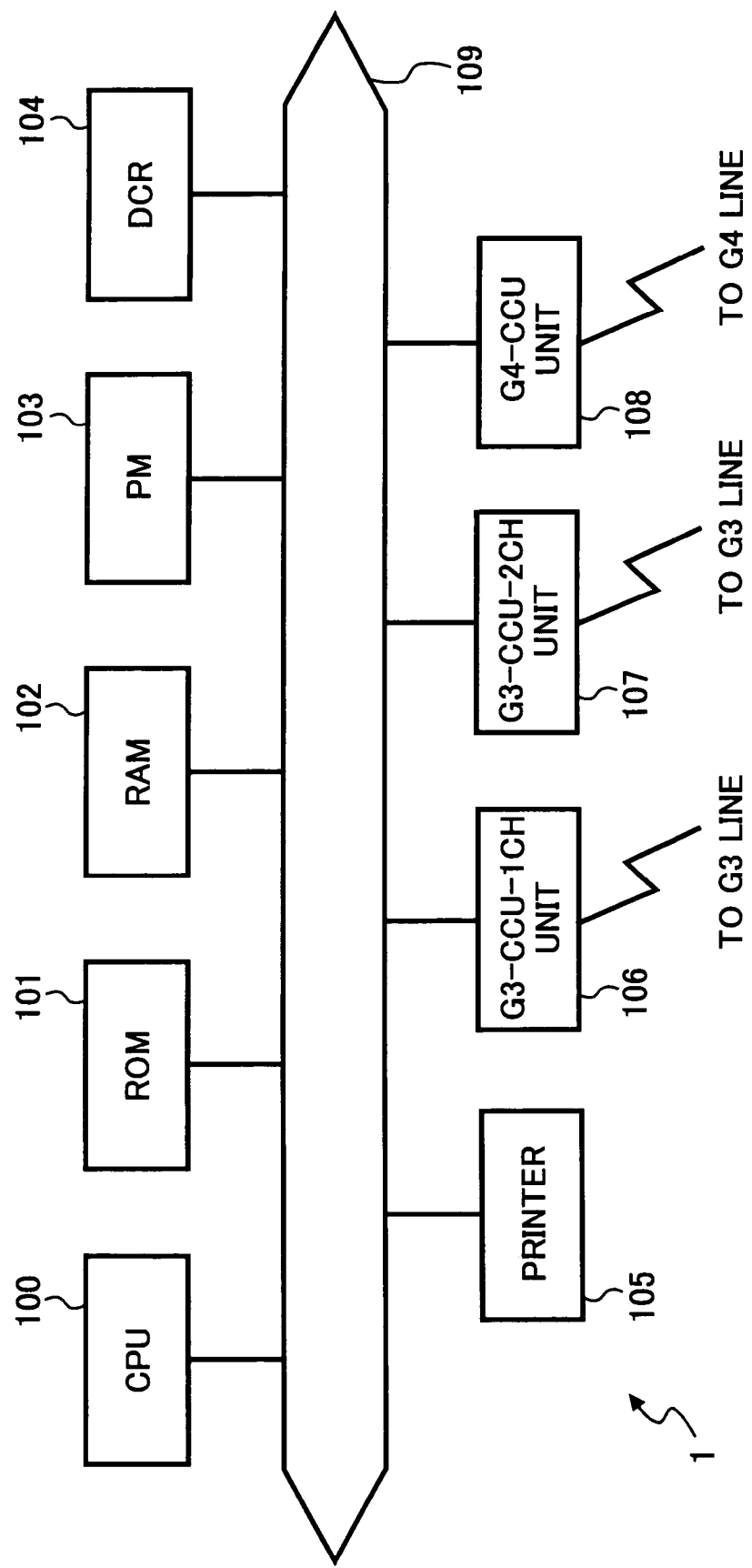
FIG. 1 is a block diagram of a facsimile apparatus according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, particularly to FIG. 1, a facsimile apparatus 1 according to an embodiment of the present invention is explained. FIG. 1 shows the facsimile apparatus 1 which includes a CPU (central processing unit) 100, a ROM (read only memory) 101, a RAM (random access memory) 102, a page memory (PM) 103, a DCR 104, a printer 105, a G3-CCU-1CH unit 106, a G3-CCU-2CH unit 107, a G4-CCU unit 108, and a system bus 109. By controlling the operations of these components, the CPU 100 controls the entire operations of the facsimile apparatus 1. The components mentioned above are connected to the system bus 109.

The ROM 101 stores a control procedure along which the facsimile apparatus 1 operates and a print color selection procedure which designates numeric numbers corresponding to print colors so that the printer 105 accordingly selects colors using the designated print colors to print an image onto a transfer sheet in accordance with facsimile image data received from other facsimile machines. The RAM 102 temporarily stores data when the CPU 100 processes the data. The PM 103 stores the facsimile image data received.

The DCR 104 returns the received facsimile image data to its original state. The printer 105 prints the received facsimile image data onto the transfer sheet using the colors designated through the print color selection procedure. Each of the G3-CCU-1CH unit 106 and the G3-CCU-2CH unit 107 individually controls the operations for transmitting and receiving facsimile image data through the G3 line. The G4-CCU unit 108 also individually controls the operations for transmitting and receiving facsimile image data through the G4 line.

Figure 2:
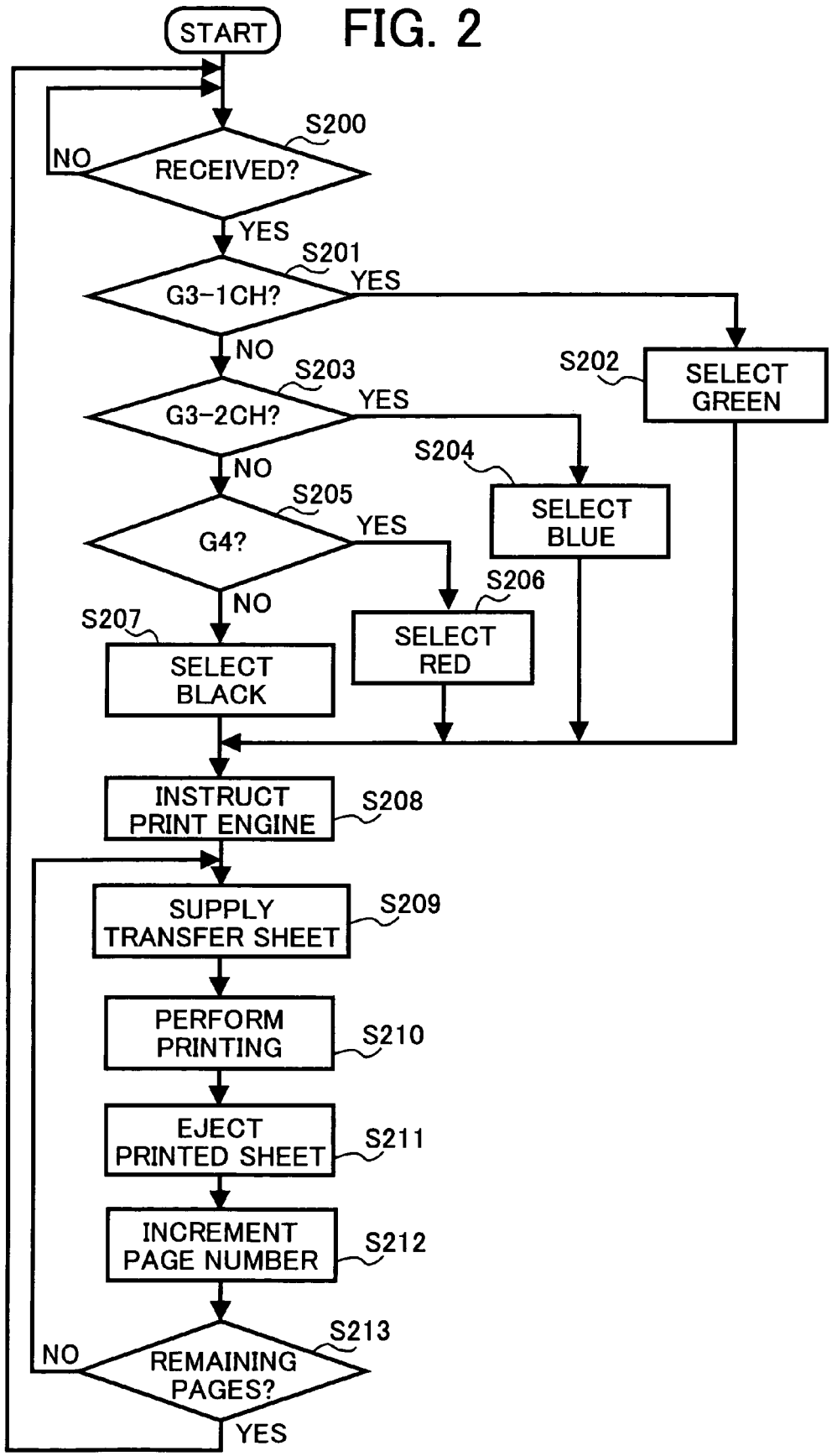
FIG. 2 is a flowchart for explaining an exemplary print color selection operation performed based on a communications procedure by the facsimile apparatus of FIG. 1.

Referring to FIGS. 1 and 2, a color change operation of the facsimile apparatus 1 is explained. In this case, the facsimile apparatus 1 has a plurality of print colors available for the printing operation performed by the printer 105. The plurality of print colors are assigned to the communications line types, such as a G3 line, a G4 line, or the like, on a one-to-one basis. When the facsimile apparatus 1 receives the facsimile image data though the G4 line, for example, it prints an image in the print color assigned to the G4 line according to the received facsimile image data.

The ROM 101 stores data representing such assignments of the print colors relative to the communications lines such as a G3 line, a G4 line, or the like. The facsimile apparatus 1 has the assignments of the green, blue, and red colors to channel one of the G3 line, channel two of the G3 line, and the G4 line, respectively. Accordingly, the printer 105 prints an image in the green color at a receipt through the G3-CCU-1CH unit 106, in the blue color at a receipt through the G3-CCU-2CH unit 107, and in the red color at a receipt through the G4-CCU unit 108.

Alternatively, the RAM 102 may be configured to store the data representing the assignments of the print colors relative to the communications lines such as the G3 line, the G4 line, or the like. In this case, the users can change the assignments of the print colors to suit their needs or preferences. This user change may conveniently be made through an operation panel (not shown) provided to the facsimile apparatus 1, or may be instructed from a host computer through a network interface (not shown) connecting the host computer and the facsimile apparatus 1.

FIG. 2 shows a flowchart of the color change procedure performed by the facsimile apparatus 1. In Step S200 of FIG.

2, the CPU 100 checks if one of the G3-CCU-1CH unit 106, the G3-CCU-2CH unit 107, and the G4-CCU unit 108 receives the facsimile image data. This check process is kept continued until one of the G3-CCU-1CH unit 106, the G3-CCU-2CH unit 107, and the G4-CCU unit 108 receives the facsimile image data. If one of the G3-CCU-1CH unit 106, the G3-CCU-2CH unit 107, and the G4-CCU unit 108 receives the facsimile image data and the check result of Step S200 is YES, the facsimile apparatus 1 then determines which unit receives the facsimile image data. Before the determination process, the CPU 100 reads an appropriate determination procedure stored in the ROM 101.

In FIG. 1, the CPU 100 determines if the G3-CCU-1CH unit 106 receives the facsimile image data. If the G3-CCU-1CH unit 106 receives the facsimile image data and the check result of Step S201 is YES, the CPU 100 reads the print color selection procedure stored in the ROM 101. In the facsimile apparatus 1, the green color is assigned as a print color for the facsimile image data received through the G3-CCU-1CH unit 106. Accordingly, the CPU 100 instructs the printer 105 in Step S202 to select the green color.

If the G3-CCU-1CH unit 106 receives no facsimile image data and the check result of Step S201 is NO, the process proceeds to Step S203 in which the CPU 100 determines if the G3-CCU-2CH unit 107 receives the facsimile image data. If the G3-CCU-2CH unit 107 receives the facsimile image data and the check result of Step S203 is YES, the CPU 100 reads the print color selection procedure stored in the ROM 101. In the facsimile apparatus 1, the blue color is assigned as a print color for the facsimile image data received through the G3-CCU-2CH unit 107. Accordingly, the CPU 100 instructs the printer 105 in Step S204 to select the blue color.

If the G3-CCU-2CH unit 107 receives no facsimile image data and the check result of Step S203 is NO, the process proceeds to Step S205 in which the CPU 100 determines if the G4-CCU unit 108 receives the facsimile image data. If the G4-CCU unit 108 receives the facsimile image data and the check result of Step S205 is YES, the CPU 100 reads the print color selection procedure stored in the ROM 101. In the facsimile apparatus 1, the red color is assigned as a print color for the facsimile image data received through the G4-CCU unit 108. Accordingly, the CPU 100 instructs the printer 105 in Step S206 to select the red color.

If the G4-CCU unit 108 receives no facsimile image data and the check result of Step S205 is NO, the CPU 100 reads the print color selection procedure stored in the ROM 101. In the facsimile apparatus 1, the black color is assigned as a print color for the facsimile image data received through none of the G3-CCU-1CH unit 106, the G3-CCU-2CH unit 107, and the G4-CCU unit 108. Accordingly, the CPU 100 instructs the printer 105 in Step S207 to select the black color.

After Step S202, S204, S206, or S207, the process proceeds to Step S208 in which the printer 105 instructs its engine mechanism (not shown) to use the print color selected in Step S202, S204, S206, or S207. Then, in Step S209, the facsimile apparatus 1 supplies a predefined transfer sheet from a sheet tray (not shown). In Step S210, the printer 105 reproduces a first page in the selected print color in accordance with the received facsimile image data on the transfer sheet supplied in Step S209. In Step S211, the printed transfer sheet is ejected from the facsimile apparatus 1. In this operation, the first page of the received facsimile image data is transferred to the printer 105 from the PM 103.

After a completion of the first page reproduction, the CPU 100 increments the page number for the next reproduction by 1 in Step S212. Then, in Step S213, the CPU 100 checks if a non-printed-page remains in the received facsimile image data or not. If a non-printed-page remains in the received facsimile image data and the check result of Step S213 is NO, the process returns to Step S209 to perform the reproduction operations for the remaining pages. If no non-printed-page remains in the received facsimile image data and the check result of Step S213 is YES, the process returns to Step S200 to repeat the same procedure as described above.

In this way, the facsimile apparatus 1 can reproduce the images in different print colors in accordance with the assignments relative to the lines, that is, relative to the communications control units used. The users thereby easily sort the transfer sheets which are stacked in the output tray (not shown) of the facsimile apparatus 1.

Figure 3:
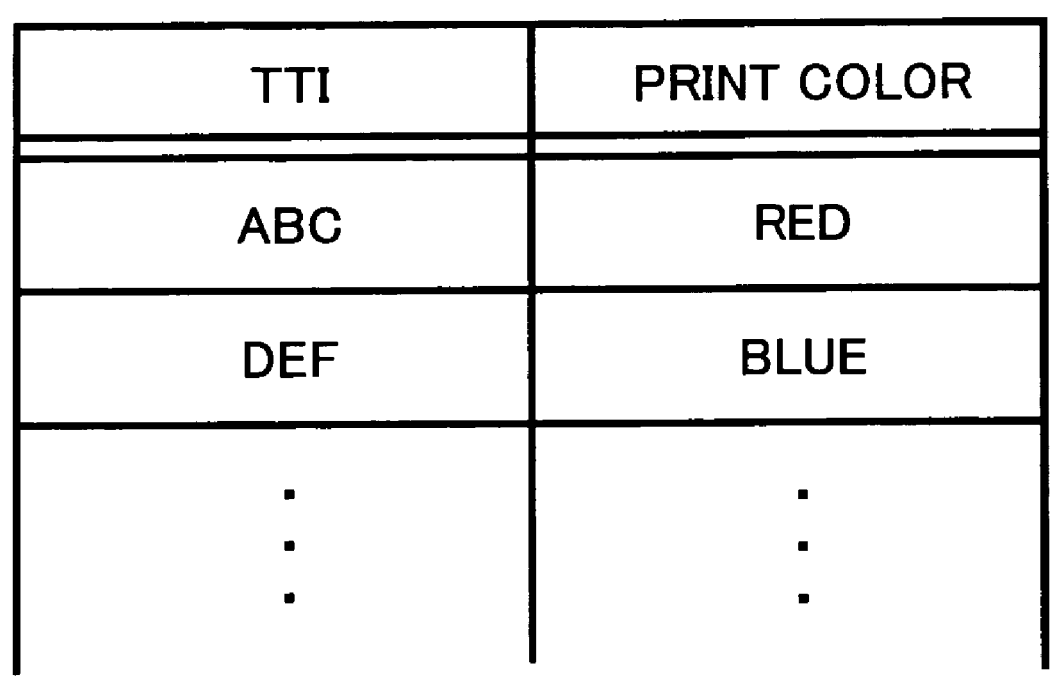

Next, another print color selection operation of the facsimile apparatus 1 is explained with reference to FIGS. 3 and 4. In this case, the facsimile apparatus 1 controls the print color on the basis of contents of a TTI (transmitter terminal identification) which is information, included in the header of the received facsimile image, for identifying the sender of the facsimile image data. FIG. 3 shows an example of a table representing a relationship between the TTI and the print color. According to this table, "ABC" of TTI corresponds to the red print color, "DEF" of TTI corresponds to the blue print color, and so on for example. That is, when the received facsimile image data includes "ABC" of TTI, for example, the facsimile apparatus 1 selects the red print color to perform the print operation using the red print color, and when the received facsimile image data includes "DEF" of TTI, for example, the facsimile apparatus 1 selects the blue print color to perform the print operation using the blue print color. The table of FIG. 3 may include a plurality of combinations of TTI and different print colors including the above-mentioned examples such as the "ABC" and the red print color and "DEF" and the blue print color. The data of the table shown in FIG. 3 is stored in a non-volatile memory (not shown) such as a NVRAM (non-volatile random access memory), for example.

Users may register and alter the combinations of the TTI and the color shown in the table of FIG. 3 through an operation panel (not shown) provided to the facsimile apparatus 1, or may instruct from a host computer through a network interface (not shown) connecting the host computer and the facsimile apparatus 1.

Figure 4:
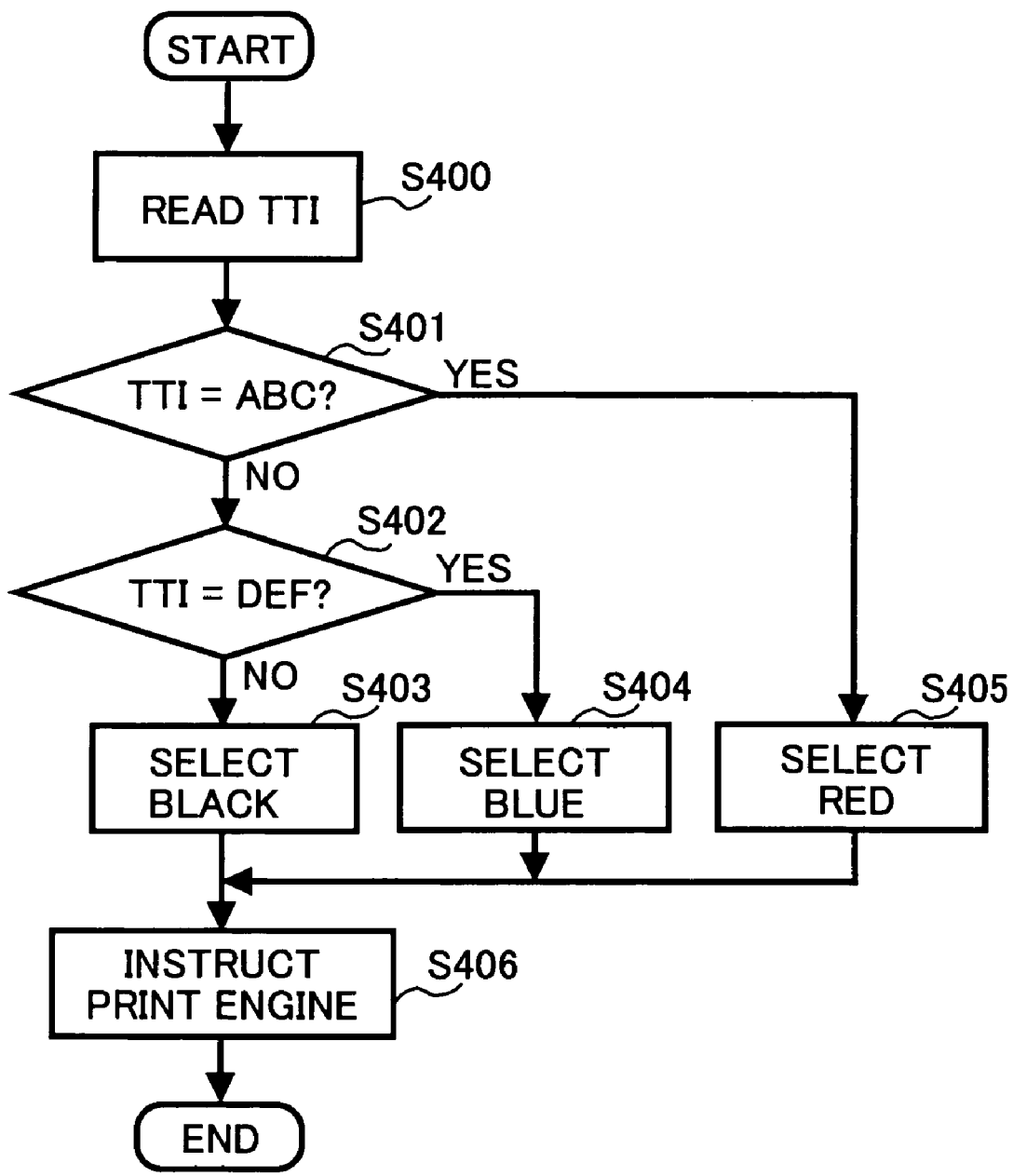
FIG. 4 is a flowchart for explaining another exemplary print color selection operation performed based on the sender identifications by the facsimile apparatus of FIG. 1.

FIG. 4 shows an exemplary procedure of the print color selection operation based on the TTI information. In Step S400, the facsimile apparatus 1 reads the TTI information of the received facsimile image data. In Step S401, the CPU 100 compares the TTI information to the table of FIG. 3 and determines if TTI corresponds to ABC. If TTI corresponds to ABC and the determination result of Step S401 is YES, the process proceeds to Step S405 in which the CPU 100 instructs the printer 105 to select the red print color. If TTI does not correspond to ABC and the determination result of Step S401 is NO, the process proceeds to Step S402 for the CPU 100 to again compare the TTI information to the table of FIG. 3 and so as to determine if TTI corresponds to DEF.

If TTI corresponds to DEF and the determination result of Step S402 is YES, the process proceeds to Step S404 in which the CPU 100 instructs the printer 105 to select the blue print color. But, if TTI does not correspond to DEF and the determination result of Step S402 is NO, the process proceeds to Step S403 and the CPU 100 instructs the printer 105 to select the black print color.

After that, in Step S406, the printer 105 instructs the print engine to use the print color selected in Step S403, S404, or S405 to reproduce an image in accordance with the received facsimile image data. Then, the print color selection operation ends.

After the print color selection operation, the facsimile apparatus 1 may reproduce the received facsimile image data on a transfer sheet using the print color selected through the print color selection operation, thereby completing the process of receiving the facsimile image information.

In the way as described above, the facsimile apparatus 1 can reproduce facsimile images in a specific print color according to the sender of the facsimile image data based on the TTI information included in the header of the received facsimile image data. The users thereby easily sort the transfer sheets stacked in the output tray (not shown) provided to the facsimile apparatus 1.

Alternatively, the facsimile apparatus 1 can use CSI (called station identification) or RTI (remote terminal identification) for the above-mentioned purpose instead of using TTI.

Next, a print color and sheet tray selection operation of the facsimile apparatus 1 is explained with reference to FIGS. 5 and 6. In this case, the facsimile apparatus 1 has a plurality of available print colors and a plurality of transfer sheet trays in each of which a type of transfer sheets are contained different from others. With this configuration, the facsimile apparatus 1 selects the print color and the type of transfer sheet on the basis of contents of the TTI (transmitter terminal identification) information. FIG. 5 shows an exemplary table representing a relationship among the TTI information, the print color, and the sheet supply tray. According to this table, "ABC" of TTI corresponds to the red print color and the first tray, "DEF" of TTI corresponds to the red print color and the second tray, "GHI" of TTI corresponds to the blue print color and the first tray, "JKL" of TTI corresponds to the blue print color and the second tray, and so on, for example. That is, when the received facsimile image data includes "ABC" of TTI, for example, the facsimile apparatus 1 selects the red print color and the first tray to perform the print operation using the red print color and the transfer sheet supplied from the first tray. For another example, when the received facsimile image data includes "DEF" of TTI, for example, the facsimile apparatus 1 selects the red print color and the second tray to perform the print operation using the red print color and the second tray. Further, when the received facsimile image data includes "GHI" of TTI, for example, the facsimile apparatus 1 selects the blue print color and the first tray to perform the print operation using the blue print color and the first tray. Further, when the received facsimile image data includes "JKL" of TTI, for example, the facsimile apparatus 1 selects the blue print color and the second tray to perform the print operation using the blue print color and the second tray.

The table of FIG. 5 may include a plurality of combinations of TTI, the print colors, and the sheet trays including the above-mentioned examples such as the cases of "ABC," "DEF," "DEF," and "JKL." The data of the table shown in FIG. 5 is stored in a non-volatile memory (not shown) such as a NVRAM (non-volatile random access memory), for example.

Users may register and alter the combinations of the TTI, the color, and the sheet tray shown in the table of FIG. 5 through an operation panel (not shown) provided to the facsimile apparatus 1, or may instruct from a host computer through a network interface (not shown) connecting the host computer and the facsimile apparatus 1.

Figure 6:
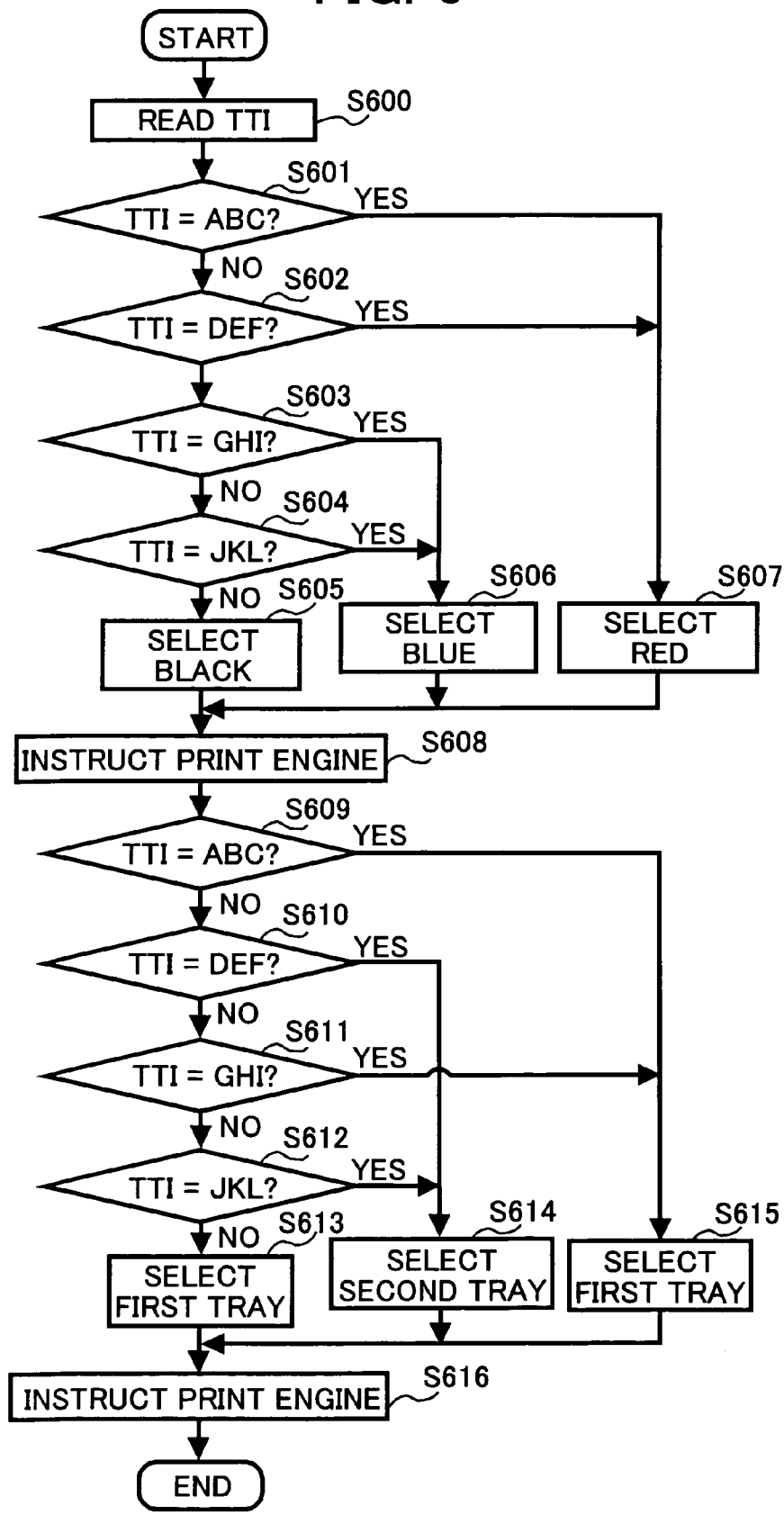
FIG. 6 is a flowchart for explaining an exemplary print color and input sheet tray selection operation performed based on the sender identifications by the facsimile apparatus of FIG. 1.

FIG. 6 shows an exemplary procedure of the print color selection operation based on the TTI information. In Step S600, the facsimile apparatus 1 reads the TTI information of the received facsimile image data. In Step S601, the CPU 100 compares the TTI information to the table of FIG. 5 and determines if TTI corresponds to ABC. If TTI corresponds to ABC and the determination result of Step S601 is YES, the process proceeds to Step S607 in which the CPU 100 instructs the printer 105 to select the red print color. If TTI does not correspond to ABC and the determination result of Step S601 is NO, the process proceeds to Step S602 for the CPU 100 to again compare the TTI information to the table of FIG. 5 and so as to determine if TTI corresponds to DEF.

If TTI corresponds to DEF and the determination result of Step S602 is YES, the process proceeds to Step S607 in which the CPU 100 instructs the printer 105 to select the red print color. But, if TTI does not correspond to DEF and the determination result of Step S602 is NO, the process proceeds to Step S603 for the CPU 100 to again compare the TTI information to the table of FIG. 5 and so as to determine if TTI corresponds to GHI.

If TTI corresponds to GHI and the determination result of Step S603 is YES, the process proceeds to Step S606 in which the CPU 100 instructs the printer 105 to select the blue print color. But, if TTI does not correspond to GHI and the determination result of Step S603 is NO, the process proceeds to Step S604 for the CPU 100 to again compare the TTI information to the table of FIG. 5 and so as to determine if TTI corresponds to JKL.

If TTI corresponds to JKL and the determination result of Step S604 is YES, the process also proceeds to Step S606 in which the CPU 100 instructs the printer 105 to select the blue print color. But, if TTI does not correspond to JKL and the determination result of Step S604 is NO, the process proceeds to Step S605 and the CPU 100 instructs the printer 105 to select the black print color.

After that, in Step S608, the printer 105 instructs the print engine to use the print color selected in Step S605, S606, or S607 to reproduce an image in accordance with the received facsimile image data.

Then, In Step S609, the CPU 100 again compares the TTI information to the table of FIG. 5 and determines if TTI corresponds to ABC. If TTI corresponds to ABC and the determination result of Step S609 is YES, the process proceeds to Step S615 in which the CPU 100 instructs the printer 105 to select the first tray. If TTI does not correspond to ABC and the determination result of Step S609 is NO, the process proceeds to Step S610 for the CPU 100 to again compare the TTI information to the table of FIG. 5 and so as to determine if TTI corresponds to DEF.

If TTI corresponds to DEF and the determination result of Step S610 is YES, the process proceeds to Step S614 in which the CPU 100 instructs the printer 105 to select the second tray. But, if TTI does not correspond to DEF and the determination result of Step S610 is NO, the process proceeds to Step S611 for the CPU 100 to again compare the TTI information to the table of FIG. 5 and so as to determine if TTI corresponds to GHI.

If TTI corresponds to GHI and the determination result of Step S611 is YES, the process proceeds to Step S615 in which the CPU 100 instructs the printer 105 to select the first tray. But, if TTI does not correspond to GHI and the determination result of Step S611 is NO, the process proceeds to Step S612 for the CPU 100 to again compare the TTI information to the table of FIG. 5 and so as to determine if TTI corresponds to JKL.

If TTI corresponds to JKL and the determination result of Step S612 is YES, the process also proceeds to Step S614 in which the CPU 100 instructs the printer 105 to select the second tray. But, if TTI does not correspond to JKL and the determination result of Step S612 is NO, the process proceeds to Step S613 and the CPU 100 instructs the printer 105 to select the first tray. Then, after instructing the print engine in Step S616 (similarly as in Step S608) the print color selection operation ends.

After the above-mentioned print color and sheet tray selection operation, the facsimile apparatus 1 may reproduce the received facsimile image data on a transfer sheet supplied from the sheet tray and using the print color both selected through the print color and sheet tray selection operation, thereby completing the process of receiving the facsimile image information.

In the way as described above, the facsimile apparatus 1 can reproduce the facsimile images in a specific print color and on a specific type of transfer sheets according to the sender of the facsimile image data based on the TTI information included in the header of the received facsimile image data. The users thereby easily sort the transfer sheets stacked in the output tray (not shown) provided to the facsimile apparatus 1.

Alternatively, the facsimile apparatus 1 can use CSI (called station identification) or RTI (remote terminal identification) for the above-mentioned purpose instead of using TTI.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

What is claimed as new and is desired to be secured by:

1. A facsimile apparatus, comprising:
   at least one communications mechanism configured to transmit and receive facsimile image data through a specific facsimile procedure;
   a printing mechanism configured to have a plurality of print colors;
   a plurality of sheet trays configured to store respective types of transfer sheets;
   a memory configured to store a first data table representing a relationship between said plurality of print colors, said plurality of sheet trays, and said at least one communications mechanism;
   a transfer sheet selection mechanism configured to select a type of transfer sheet; and
   a processor configured to select one of said respective types of transfer sheets from a respective sheet tray and one of said plurality of print colors in accordance with data stored in said first data table when one of said at least one communications mechanism receives facsimile image data and to instruct said printing mechanism to print said received facsimile image data using said one of said plurality of print colors selected by said processor based on the at least one communications mechanism and corresponding specific facsimile procedure used to receive the facsimile image data.

2. The facsimile apparatus as defined in claim 1, wherein said processor is further configured to select one of said plurality of print colors in accordance with data stored in said first data table on a basis of the at least one communications mechanism used to receive said facsimile image data.

3. The facsimile apparatus as defined in claim 1, wherein said memory further stores a second data table representing a relationship between said plurality of print colors and identification information for identifying a sender of facsimile image data, said identification information being included in said received facsimile image data, and said processor is further configured to select one of said plurality of print colors in accordance with data stored in said second data table on a basis of said identification information.

4. The facsimile apparatus as defined in claim 3, wherein said identification information is selected from the group consisting of: a transmitter terminal identification, a called station identification, and a remote terminal identifier, included in a header of said received facsimile image data.

5. The facsimile apparatus as defined in claim 1, wherein said at least one communications mechanism is configured to transmit and receive said facsimile image data through at least one of G3 and G4 facsimile procedures.

6. The facsimile apparatus as defined in claim 1, wherein said memory further stores a second data table representing a relationship among said plurality of print colors, said type of transfer sheet, and said at least one communications mechanism, and said processor is further configured to select one of said plurality of print colors and said type of transfer sheet in accordance with data stored in said second data table.

7. The facsimile apparatus as defined in claim 6, wherein said processor is further configured to select one of said plurality of print colors and said type of transfer sheet in accordance with data stored in said second data table on a basis of the at least one communications mechanism used to receive said facsimile image data.

8. The facsimile apparatus as defined in claim 6, wherein said memory further stores a third data table representing a relationship between said plurality of print colors, said type of transfer sheet, and identification information for identifying a sender of facsimile image data, said identification information being included in said received facsimile image data, and said processor is further configured to select one of said plurality of print colors and said type of transfer sheet in accordance with data stored in said third data table on a basis of said identification information.

9. The facsimile apparatus as defined in claim 6, wherein said transfer sheet selection mechanism is further configured to select one of transfer sheet trays, said memory stores a third data table representing a relationship among said plurality of print colors, said one of transfer sheet trays, and said at least one communications mechanism, and said processor is further configured to select one of said plurality of print colors and said one of transfer sheet trays in accordance with data stored in said third data table.

10. A facsimile apparatus, comprising:
    at least one communications means for transmitting and receiving facsimile image data through a specific facsimile procedure;
    printing means for reproducing an image in one of a plurality of print colors;

a plurality of storing means for storing respective types of transfer sheets, memory means for storing a first data table representing a relationship between said plurality of print colors, said plurality of storing means, and said at least one communications means;

transfer sheet selection means for selecting a type of transfer sheet; and processing means for selecting one of said respective types of transfer sheets from a respective storing means and one of said plurality of print colors in accordance with data stored in said first data table when one of said at least one communications means receives facsimile image data and instructs said printing means to print said received facsimile image data using said one of said plurality of print colors selected by said processing means based on the at least one communications means and corresponding specific facsimile procedure used to receive the facsimile image data.

11. The facsimile apparatus as defined in claim 10, wherein said processing means further selects one of said plurality of print colors in accordance with data stored in said first data table on a basis of the at least one communications means used to receive said facsimile image data.

12. The facsimile apparatus as defined in claim 10, wherein said memory means further stores a second data table representing a relationship between said plurality of print colors and identification information for identifying a sender of facsimile image data, said identification information being included in said received facsimile image data, and said processing means further selects one of said plurality of print colors in accordance with data stored in said second data table on a basis of said identification information.

13. The facsimile apparatus as defined in claim 12, wherein said identification information is selected from the group consisting of: a transmitter terminal identification, a called station identification, and a remote terminal identifier, included in a header of said received facsimile image data.

14. The facsimile apparatus as defined in claim 10, wherein said at least one communications means transmits and receives said facsimile image data through at least one of G3 and G4 facsimile procedures.

15. The facsimile apparatus as defined in claim 10, wherein said memory means further stores a second data table representing a relationship among said plurality of print colors, said type of transfer sheet, and said at least one communications means, and said processing means further selects one of said plurality of print colors and said type of transfer sheet in accordance with data stored in said second data table.

16. The facsimile apparatus as defined in claim 15, wherein said processing means further selects one of said plurality of print colors and said type of transfer sheet in accordance with data stored in said second data table on a basis of the at least one communications means used when receiving said facsimile image data.

17. The facsimile apparatus as defined in claim 15, wherein said memory means further stores a third data table representing a relationship between said plurality of print colors, said type of transfer sheet, and identification information for identifying a sender of facsimile image data, said identification information being included in said received facsimile image data, and said processing means further selects one of said plurality of print colors and said type of transfer sheet in accordance with data stored in said third data table on a basis of said identification information.

18. The facsimile apparatus as defined in claim 15, wherein said transfer sheet selection means further selects one of transfer sheet trays, said memory means stores a third data table representing a relationship among said plurality of print colors, said one of transfer sheet trays, and said at least one communications means, and said processing means further selects one of said plurality of print colors and said one of transfer sheet trays in accordance with data stored in said third data table.

19. A method of sorting output transfer sheets from a plurality of sheet trays configured to store respective types of transfer sheets in a facsimile apparatus, comprising:

storing a first data table representing a relationship between a plurality of print colors, said plurality of sheet trays and at least one communications procedure;

selecting one of said respective types of transfer sheets from a respective sheet tray and one of said plurality of print colors in accordance with data stored in said first data table when said facsimile apparatus receives facsimile image data through one of said at least one communications procedure; and printing said received facsimile image data onto one of said types of transfer sheets and in said one of said plurality of print colors selected in said selecting based on the facsimile apparatus and corresponding specific communications procedure used to receive the facsimile image data.

20. The method as defined in claim 19, wherein said selecting further selects one of said plurality of print colors in accordance with data stored in said first data table on a basis of said communications procedure used to receive said facsimile image data.

21. The method as defined in claim 19, wherein said storing further stores a second data table representing a relationship between said plurality of print colors and identification information for identifying a sender of facsimile image data, said identification information being included in said received facsimile image data, and said selecting further selects one of said plurality of print colors in accordance with data stored in said second data table on a basis of said identification information.

22. The method as defined in claim 21, wherein said identification information is selected from the group consisting of: a transmitter terminal identification, a called station identification, and a remote terminal identifier, included in a header of said received facsimile image data.

23. The method as defined in claim 19, wherein said at least one communications procedure is at least one of G3 and G4 facsimile procedures.

24. The method as defined in claim 19, wherein said storing further stores a second data table representing a relationship among said plurality of print colors, a type of transfer sheet, and said at least one communications procedure, said selecting further selects one of said plurality of print colors and said type of transfer sheet in accordance with data stored in said second data table, and said printing prints said received facsimile image data in said one of said plurality of print colors and on said type of transfer sheet both selected in said selecting.

25. The method as defined in claim 24, wherein said selecting further selects one of said plurality of print colors and said type of transfer sheet in accordance with data stored in said second data table on a basis of said communications procedure used to receive said facsimile image data.

26. The method as defined in claim 24, wherein said storing further stores a third data table representing a relationship between said plurality of print colors, said type of transfer sheet, and identification information for identifying a sender of facsimile image data, said identification information being included in said received facsimile image data, and said selecting further selects one of said plurality of print colors and said type of transfer sheet in accordance with data stored in said third data table on a basis of said identification information.

27. The method as defined in claim 24, said method further comprising:

switching between a plurality of transfer sheet trays, wherein said storing stores a third data table representing a relationship among said plurality of print colors, said plurality of transfer sheet trays, and said at least one communications procedure; and said selecting further selects one of said plurality of print colors and one of said plurality of transfer sheet trays in accordance with data stored in said third data table.

* * * * *